No. 650,236. Patented May 22, 1900.
C. E. FOREMAN.
TRUCK ATTACHMENT FOR SULKY RAKES.
(Application filed Feb. 5, 1900.)
(No Model.)
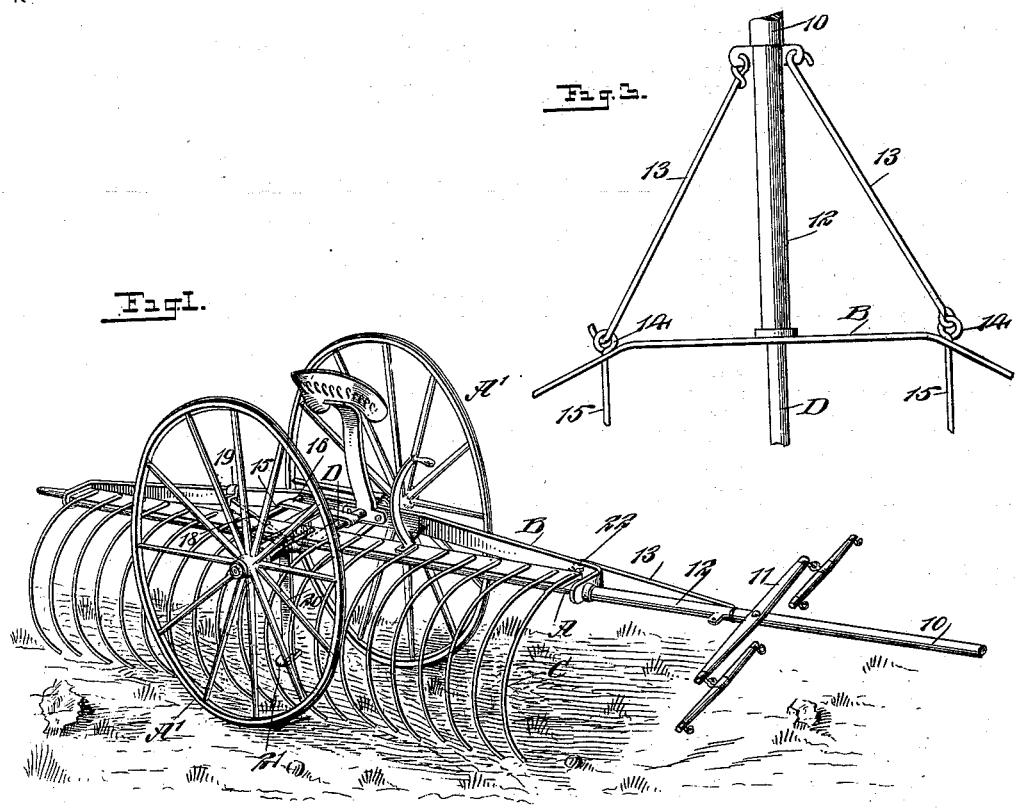
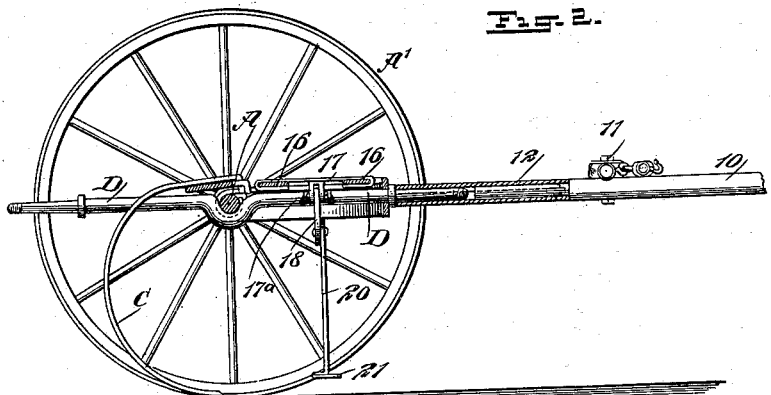
WITNESSES:
INVENTOR
Charles E. Foreman
BY
ATTORNEYS

UNITED STATES PATENT OFFICE.

CHARLES E. FOREMAN, OF PAWNEE, OKLAHOMA TERRITORY.

TRUCK ATTACHMENT FOR SULKY-RAKES.

SPECIFICATION forming part of Letters Patent No. 650,236, dated May 22, 1900.

Application filed February 5, 1900. Serial No. 4,051. (No model.)

*To all whom it may concern:*

Be it known that I, CHARLES E. FOREMAN, a citizen of the United States, and a resident of Pawnee, in the county of Pawnee and Territory of Oklahoma, have invented a new and Improved Truck Attachment for Sulky-Rakes, of which the following is a full, clear, and exact description.

One purpose of the invention is to provide a means whereby a hay-rake of great length may be so mounted that it will readily pass through a comparatively-narrow opening or may be conveniently drawn through narrow roads or lanes when being taken to or from a field.

A further object of the invention is to provide a means whereby the pole or tongue of the implement may be transferred from the front of the implement to an end portion thereof and the supporting-wheels placed at the front and rear of the implement, and likewise to provide means for lifting the frame or body of the implement in a manner which will enable the wheels to be quickly and conveniently shifted.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved implement, showing the manner in which it is mounted when it is to be drawn to or from a field. Fig. 2 is a central transverse section through the implement with the tongue or pole in its front or working position; and Fig. 3 is a plan view of the forward portion of the frame of the implement and a portion of the tongue or pole, illustrating the manner in which the tongue or pole is connected with the frame when the rake is to be used in a field.

A represents the main axle, upon the ends of which the supporting-wheels A' are mounted to revolve.

B represents the frame of the implement, and C the rake-teeth, the head for the said rake-teeth being mounted upon the main axle in any suitable or approved manner. An auxiliary axle D is also employed, which is centrally located on the frame B and extends transversely in a forward and rearward direction under the main axle, the auxiliary axle D being provided with spindles at its ends, upon which the supporting-wheels A' are mounted to turn.

The pole or tongue 10 is shown provided with the usual doubletree 11, and said pole or tongue 10 at its inner end has a tubular section 12, adapted to receive a spindle of either the main axle A or the auxiliary axle D. The auxiliary axle D, as shown in Fig. 2, is preferably made to drop at its center, where it receives and is attached to the main or longitudinal axle A.

When the implement is to be used for raking hay, the inner tubular section 12 of the pole or tongue 10 is passed over the front spindle-section of the auxiliary axle D, as shown in Fig. 2, and, as illustrated in Fig. 3, the pole or tongue is held in this position through the medium of braces 13, detachably attached in any suitable manner to the pole or tongue (one at each side) and attached to the frame B through the medium of eyes or loops 14 or the equivalents of the same. A brace 15 is located at one side of the auxiliary axle D, said brace constituting a portion of the frame, and a second and corresponding brace may be provided at the opposite side of the auxiliary axle. The eyes 14 may be formed, and usually are formed, at the forward or outer ends of the braces 15. Transverse slats or strips 16 are attached to the auxiliary axle D and to one of the braces 15, and a longitudinal strip 17 is usually supported by the transverse strips 16, as shown in Fig. 2. The longitudinal strip 17 is provided with ears 17ª, in which ears an elbow-lever 18 is fulcrumed, and when the lever is in its upper position it is secured by means of a suitable keeper 19. (Shown in Fig. 1.)

Where the members of the elbow-lever connect a standard 20 is pivoted, terminating in a foot 21, and said standard and foot and elbow-lever constitute, virtually, a jack, since when the standard is in the vertical position shown in Fig. 1 and the lever 18 is dropped so as to bring the foot of the standard 21 on the ground and the lever is forced downward past its dead-center the frame of the machine will be elevated to such an extent that the supporting-wheels may be readily removed from the main axle A.

When the implement is to be drawn to or from a field, the jack is operated as above mentioned and the supporting-wheels are removed from the spindles of the main or longitudinal axle A, and said supporting-wheels are then placed upon the auxiliary or transverse axle D, as shown in Fig. 1. The pole or tongue 10, which is disconnected from the auxiliary axle D prior to the supporting-wheels being placed thereon, is made to receive one of the spindles of the main axle A, as shown in Fig. 1, and the single brace 13 is at this time only needed to hold the pole or tongue in place, since the brace is made to enter an eye 22, located at the front of the frame B at or near one of its ends. Thus it will be observed that the rake may be drawn to and from the field end foremost and for safe passage will only require a space slightly wider than the width of the implement. When the implement reaches the field, the jack is again called into use and the wheels are transferred from the auxiliary to the main axle, the tongue or pole being removed from the main axle and attached to the forward end of the auxiliary axle.

Having thus described my invention, I claim as new and desire to secure by Letters Patent—

1. A sulky-rake having two axles arranged at right angles to each other and each having its spindled end projecting beyond the frame, whereby provision is made for mounting the supporting-wheels on either axle, as and for the purpose set forth.

2. A sulky-rake, comprising a frame, a main axle, a rake mounted on the axle, an auxiliary axle located at the center of the frame and extending at right angles to the main axle, the auxiliary axle having spindles at its ends, and supporting-wheels adapted to be mounted on either axle, substantially as described.

3. In a sulky-rake, a main and an auxiliary axle, said axles being at angles to one another, a pole or tongue arranged for attachment to the end of either axle, and means for securing the said pole or tongue in the position in which it is placed.

4. In a sulky-rake, a frame provided with a longitudinal axle, an auxiliary axle carried transversely of the frame, crossing the main axle, supporting-wheels adapted to be mounted upon either axle, a pole or tongue having a socket to receive one end of either axle, a connection between the tongue and frame and a jack carried by the implement, whereby the body of the implement may be raised to such an extent that the supporting-wheels may be readily removed from the axle on which they are mounted, as specified.

5. In a sulky-rake, the combination with a frame, a main axle, a rake mounted on the main axle, and an auxiliary axle at the center of the frame and at right angles to the main axle, of a tongue having a tubular inner section adapted to receive one end of either axle, and means for connecting the tongue with the frame, substantially as described.

6. In a sulky-rake, the combination with a frame, a main axle, a rake mounted on the main axle, and an auxiliary axle at right angles to the main axle, of a pivoted elbow-lever, and a standard carried by the elbow-lever and provided with a foot at its lower end, substantially as and for the purpose set forth.

In testimony whereof I have signed my name to this specification in the presence of two subscribing witnesses.

CHARLES E. FOREMAN.

Witnesses:
J. N. COULTER,
JAS. H. HALE.